US007640309B2

(12) United States Patent
Li et al.

(10) Patent No.: US 7,640,309 B2
(45) Date of Patent: Dec. 29, 2009

(54) SYSTEM AND METHOD FOR PROVIDING INSTANT MESSAGING CAPABILITY IN CONJUCTION WITH AN ONLINE REFERENCE

(75) Inventors: Li Li, Issaquah, WA (US); Ying Li, Bellevue, WA (US); Brian Burdick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 141 days.

(21) Appl. No.: 11/074,099

(22) Filed: Mar. 7, 2005

(65) Prior Publication Data

US 2006/0200525 A1 Sep. 7, 2006

(51) Int. Cl.
G06F 15/16 (2006.01)
G06F 17/30 (2006.01)
(52) U.S. Cl. .................. 709/206; 709/204; 707/3
(58) Field of Classification Search ......... 709/204–206; 707/1–3; 715/200, 700
See application file for complete search history.

(56) References Cited

U.S. PATENT DOCUMENTS

| 6,993,564 | B2 * | 1/2006 | Whitten, II | 709/207 |
| 2002/0035605 | A1 * | 3/2002 | McDowell et al. | 709/206 |
| 2005/0021645 | A1 | 1/2005 | Kulkarni et al. | |
| 2005/0209932 | A1 * | 9/2005 | Hui | 705/27 |
| 2006/0026237 | A1 * | 2/2006 | Wang et al. | 709/206 |
| 2006/0048061 | A1 * | 3/2006 | Forlenza et al. | 715/751 |
| 2006/0074843 | A1 * | 4/2006 | Pereira | 707/1 |

FOREIGN PATENT DOCUMENTS

WO WO 9918514 A1 * 4/1999

OTHER PUBLICATIONS

Wells, Catherine A. "Location, Location, Location The Importance of Placement of the Chat Request Button"; Reference and User Services Quarterly; Winter 2003; American Library Association; V43, No. 2; p. 133-137.*
Online Status Indicator http://web.archive.org/web/20040206072006/http://onlinestatus.org, dated Feb. 6, 2004 on the Wayback machine accessed on Dec. 6, 2006.*

(Continued)

*Primary Examiner*—Nathan Flynn
*Assistant Examiner*—Joshua Joo
(74) *Attorney, Agent, or Firm*—Shook, Hardy & Bacon L.L.P.

(57) ABSTRACT

Methods for providing instant messaging capability in conjunction with an online reference is provided. In one embodiment, the method may include receiving an indication to initiate display of online content, selecting at least one reference in response to the indication, the at least one reference being associated with a source, and displaying the at least one reference in association with an instant messaging enablement indicator. If desired, the instant messaging enablement indicator may be different depending upon whether the source associated with the at least one reference is not instant messaging enabled, is instant messaging enabled but not currently online, and is instant messaging enabled and currently online. Accordingly, the method may further include determining if the source associated with the at least one selected reference is instant messaging enabled and, if so, determining if the source is currently capable of at least one of receiving and transmitting instant messages.

12 Claims, 3 Drawing Sheets

OTHER PUBLICATIONS

Reference & User Services Quarterly Winter 2003 Wells Catherine A. Publsiher American Library Association vol. 43, No. 2 pp. 133-137.*

Stuart Henshall, "Qzoxy—Skype Presence Servers," [Online], www.skypejournal.com, Nov. 9, 2004, p. 1—paragraph 1, p. 2—paragraph 1, retrieved from the Internet—http.//www.skypejournal.com/blog/archives/2004/11/qzoxy_skype_pre.php.

"Online Status Indicator," www.onlinestatus.org, [Online], Feb. 28, 2005, retrieved from the Internet—http://web.archive.org/web/20050228085040/http://www.onlinestatus.org/, Internet Archive Wayback Machine Search Result, [Online], http://www.archive.org, retrieved from the Internet Apr. 5, 2006—http://web.archive.org/web/indicator.html.

Stuart Henshall, "Skype Presence Active," www.skypejournal.com, [Online], Nov. 9, 2004, retrieved from the Internet—http.//www.skypejournal.com/blog/archives/2004/11/qzoxy_skype_presence.php.

"ICQ Status Indicator," www.icq.com, [Online], Mar. 3, 2005, retrieved from the Internet—http://web.archive.org/web/20050303014158/http://www.icq.com/features/web/indicator.html, Internet Archive Wayback Machine Search Result, [Online], http://www.archive.org, retrieved from the Internet Apr. 5, 2006—http://web.archive.org/web/indicator.html.

"European Search Report", European Patent Office, Apr. 25, 2006.

* cited by examiner

SYSTEM AND METHOD FOR PROVIDING INSTANT MESSAGING CAPABILITY IN CONJUCTION WITH AN ONLINE REFERENCE

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates to computing environments. More particularly, embodiments of the present invention relate to systems and methods for integrating instant messaging capabilities with online content, e.g., the results of a search query or an online advertisement. Further, embodiments of the present invention relate to systems and methods for automatically providing instant messaging capability between global computer network users, e.g., Internet users, and online advertisers.

BACKGROUND OF THE INVENTION

Currently, one of the biggest inconveniences global computer network users, e.g., Internet users, face when accessing online directories, for instance, online yellow pages and/or local search sites, is that although the users can easily access contact information for a business or individual they desire to contact, they still have to undertake a separate, unrelated action to enable that contact. For instance, although a user can access the telephone number of a business using an online yellow page service, they still have to manually key in the telephone number into a telephone to interact with that business.

A similar inconvenience exists when a user is viewing an online advertisement and desires to contact the provider thereof. A separate, unrelated action is required to enable the desired contact.

Accordingly, a system and method for facilitating the initiation of contact between an Internet user and a business (or individual) having its contact information accessible online would be desirable. Additionally, a system and method for enabling contact initiation between an Internet user and a business (or individual) currently accessible online would be advantageous.

BRIEF SUMMARY OF THE INVENTION

Embodiments of the present invention provide a method for providing instant messaging capability in conjunction with an online reference, e.g., a particular result of a search query or an online advertisement. In one aspect, the method may include receiving an indication to initiate display of online content, selecting at least one reference in response to the indication, the at least one reference being associated with a source, and displaying the at least one reference in association with an instant messaging enablement indicator. If desired, the instant messaging enablement indicator may be different depending upon whether the source associated with the at least one reference is not instant messaging enabled, is instant messaging enabled but not currently online, or is instant messaging enabled and currently online. Accordingly, the method may further include determining if the source associated with the at least one selected reference is instant messaging enabled and, if so, determining if the source is currently capable of at least one of receiving and transmitting instant messages, that is, if the source is currently online.

Embodiments of the present invention further provide a computer system for providing instant messaging capability in conjunction with an online reference. In one aspect, the computer system may include a receiving module for receiving an indication to initiate display of online content, a selecting module for selecting at least one reference in response to the indication, the at least one reference being associated with a source, and a displaying module for displaying the at least one reference in association with an instant messaging enablement indicator.

Still further, embodiments of the present invention provide a user interface embodied on at least one computer-readable medium, the user interface for providing instant messaging capability in conjunction with an online reference. In one aspect, the user interface may include a reference display area configured to display at least one reference in response to an indication to initiate display of online content, the at least one reference being associated with a source, and an instant messaging enablement display area configured to display an instant messaging enablement indicator in association with the at least one reference. If desired, the instant messaging enablement indicator may be different depending upon whether the source associated with the at least one reference is not instant messaging enabled, is instant messaging enabled but not currently online, or is instant messaging enabled and currently online.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods for integrating instant messaging capabilities with online content, e.g., the results of a search query or an online advertisement. Further, embodiments of the present invention provide systems and methods for enabling instant messaging capability between global computer network users, e.g., Internet users, and online businesses, e.g., advertisers, and the like. In one embodiment, when a business, e.g., an advertiser, desiring its contact information to be accessible online signs up for such service, it associates its messenger accounts (i.e., its instant messaging accounts) with its advertising accounts. In this way, when an online user initiates an action that results in display of the advertiser's listing or advertisement, the user will be presented not only with the advertiser's contact information but also with an indicator that indicates whether or not the advertiser is instant messaging enabled and whether the advertiser currently has a representative thereof capable of at least one of receiving and transmitting instant messages. If the advertiser is online, i.e., if a representative of the advertiser is capable of at least one of receiving and transmitting instant messages, and if the user is also logged into the same or a compatible instant messaging system, the user may select the instant messaging enablement indicator and initiate online contact with the advertiser.

Enabling instant messaging between global computer network users, e.g., Internet users, and advertisers having their contact information online provides an alternative route for direct real-time interaction between a user and an advertiser. Such capability provides a great convenience to users and facilitates improved customer service from the advertiser, or other business, whose contact information has been displayed as a result of an action initiated by the user.

Having briefly described an overview of the present invention, an exemplary operating environment for the present invention is described below.

Figure 1:
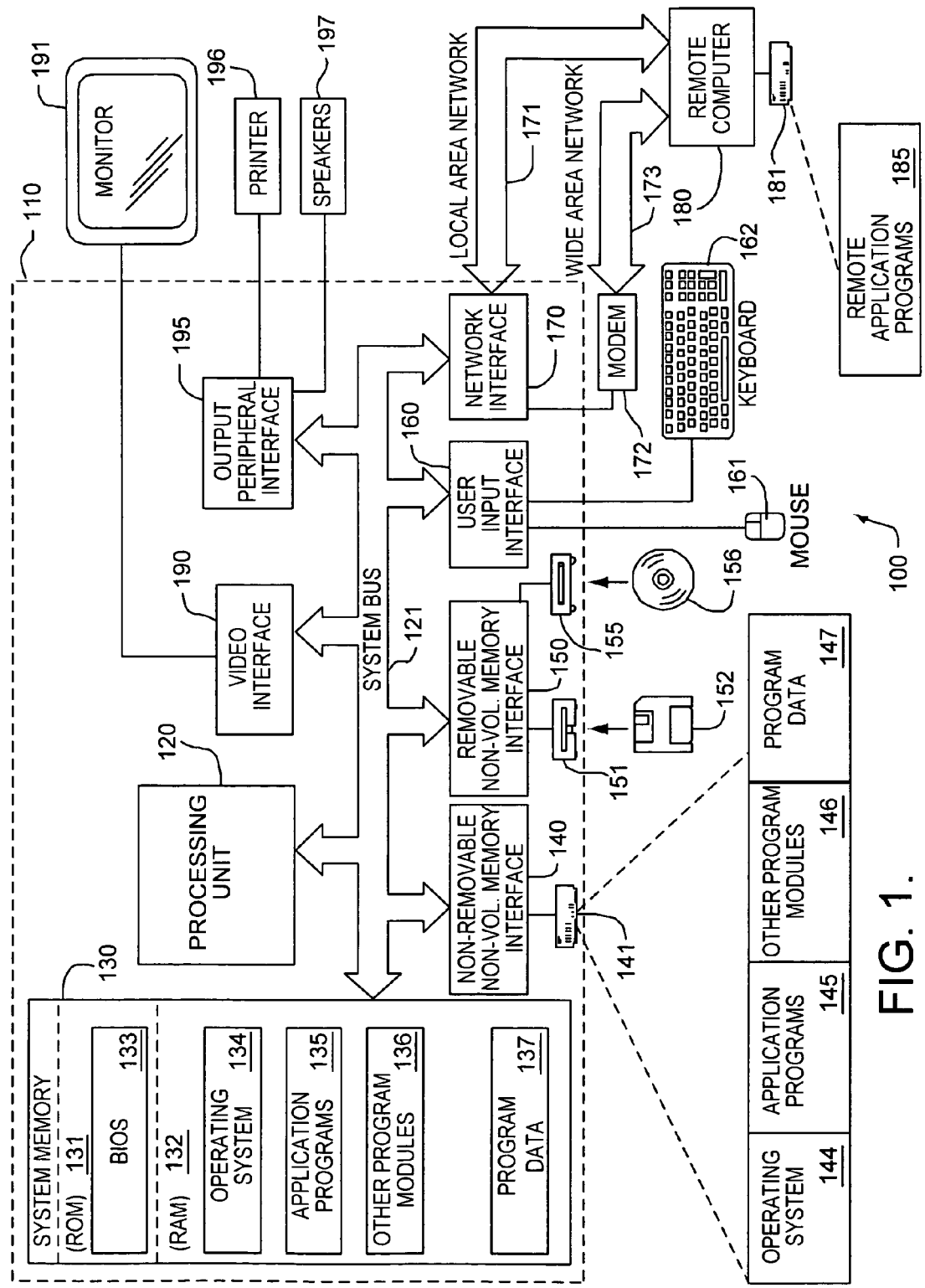
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

Figure 2:
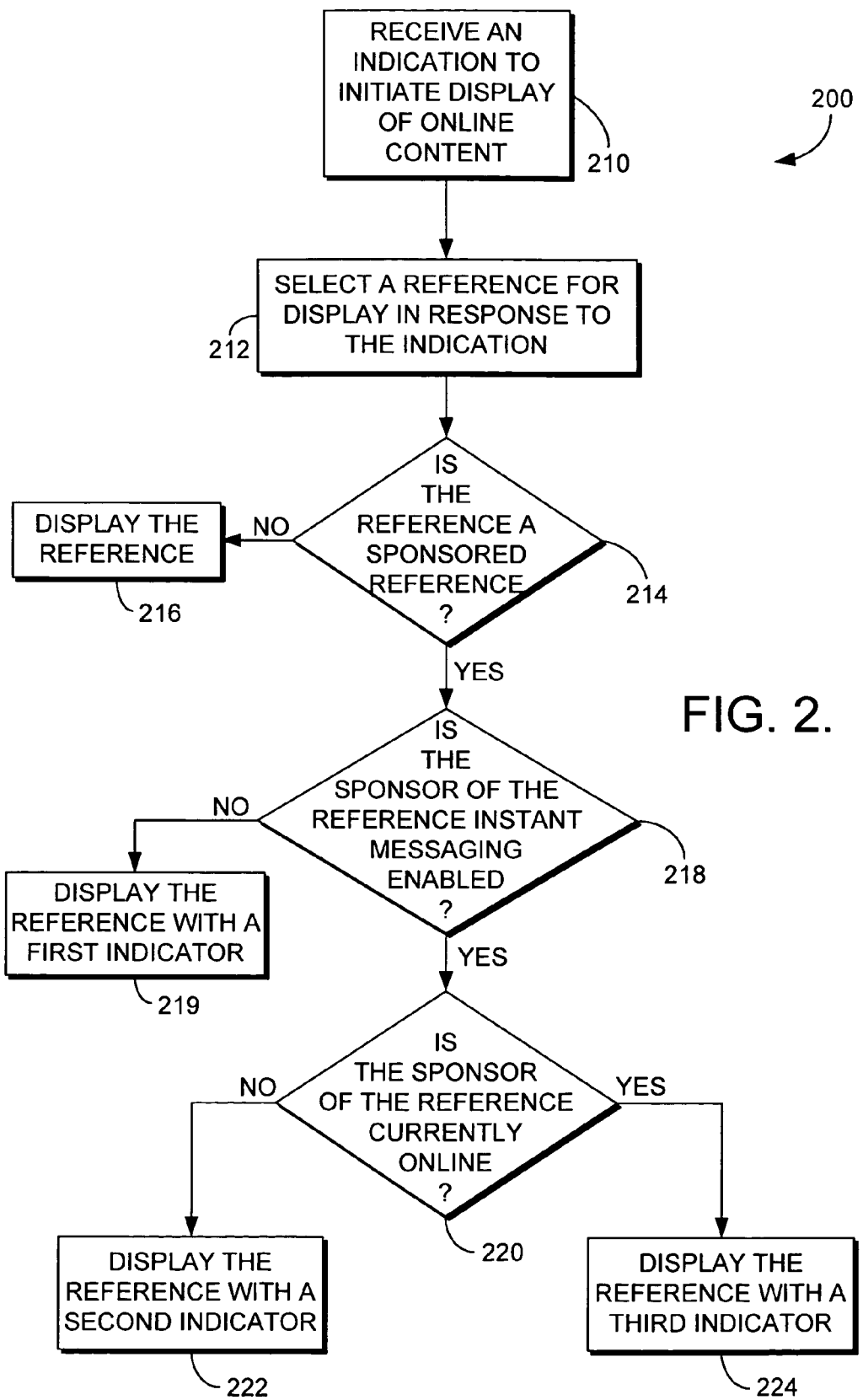
FIG. 2 is a flow diagram showing a method for providing instant messaging capability in conjunction with an online reference, in accordance with an embodiment of the present invention.

As previously mentioned, embodiments of the present invention relate to methods for providing instant messaging capability in conjunction with an online reference. With reference to FIG. 2, a method for providing such capability in accordance with an embodiment of the present invention is illustrated and designated generally as reference numeral 200. Initially, a indicated at block 210, an indication to initiate display of online content is received by the system. Such indication may be, for example, a search request. For instance, a search request may be input into a search field of an online directory provider by a global computer network user, e.g., an Internet user. In this instance, the search request may set forth one or more criteria based upon which the user desires to view a reference to each of a plurality of businesses (or individuals) satisfying the criteria. By way of example only, a user may input into a search field of an online directory provider the terms "restaurant" and "Seattle" if the user desires to locate a restaurant in the Seattle, Wash. area.

Alternatively, the indication to initiate display of online content may be a request by a user to view a particular website or the like. All such variations, and any combination thereof, are contemplated to be within the scope of the present invention.

Once an indication to initiate display of online content has been received, one or more references are selected for display in response to the search request. This is indicated at block 212. If the indication received is a search query, the one or more selected references are indicative of content providers, e.g., businesses or individuals, that satisfy the criteria set forth in the search request and that have their contact information available online. For instance, referring back to the example indicated hereinabove, in response to receiving the search request "restaurant" and "Seattle", the system may select references associated with T.G.I.Friday's and/or Chili's, among others, for display. If, however, the indication is a request to view a particular website or the like, the one or more selected references may be online advertisements having some association with the requested website.

Subsequently, it is determined whether or not each of the one or more references is a sponsored reference, as indicated at block 214. A "sponsored" reference, as the term is used herein, refers to a reference associated with a business or individual that has provided an indication of its instant messaging capabilities to the system. That is, a "sponsored" reference is a reference associated with a business or individual whose instant messaging capabilities are known. If the reference for which such determination is being made is not associated with a business (or individual) whose instant messaging capabilities are known, the reference may simply be displayed as a result of the received indication to initiate display of online content without further action, as indicated at block 216.

However, if it is determined at block 214 that the instant messaging capabilities of the reference for which such determination is being made are known and, thus, it is determined that the reference is a sponsored reference, it is subsequently determined if the sponsor of the reference (that is, the business or individual associated with the reference) is instant messaging enabled. This is indicated at block 218. Those business (or individuals) that are instant messaging enabled are those businesses (or individuals) which are capable of engaging in instant messaging with online users. That is, "instant messaging enabled" businesses (or individuals) are those businesses (or individuals) that have their instant messaging accounts associated with their online reference accounts, e.g., advertising accounts.

If the reference for which the determination is being made is not instant messaging enabled, the reference may be displayed as a result of the received indication to initiate display of online content in conjunction with a first instant messaging enablement indicator that indicates that the sponsor is not instant messaging enabled. This is indicated at block 219. However, if it is determined at block 218 that the sponsor of the reference is instant messaging enabled, it is subsequently determined if the sponsor of the reference is currently online, as indicated at block 220. That is, it is determined whether or not the sponsor of the reference currently has a representative thereof that is capable of at least one of receiving and transmitting instant messages.

If the reference for which the determination is being made is instant messaging enabled but is not currently online, the reference may be displayed as a result of the received indication to initiate display of online content in conjunction with a second instant messaging enablement indicator that indicates that the sponsor is instant messaging enabled but currently unavailable online. This is indicated at block 222. In one embodiment, the second instant messaging enablement indicator may include an indication of when a representative will be available, for instance, a clock indicating a particular time at which a representative will be available online or the like.

If it is determined at block 220 that the sponsor of the reference is currently online, the reference may be displayed as a result of the received indication to initiate display of online content in conjunction with a third instant messaging enablement indicator that indicates that the sponsor is instant messaging enabled and currently available online. This is indicated at block 224. In one embodiment, the third instant messaging enablement indicator may be a selectable indicator, selection of which initiates an instant messaging session between the user and the online representative of the reference sponsor.

If desired, the first, second, and third instant messaging enablement indicators may be entirely different indicators or may be variations of a single, basic indicator design. For instance, by way of example only, the first instant messaging enablement indicator may be an outline of a given shape, the second instant messaging enablement indicator may be an outline of the same shape filled in with a particular color or shading pattern, and the third instant messaging enablement indicator may be an outline of the same shape filled in with a different color or shading pattern. All such variations are contemplated to be within the scope hereof.

Figure 3:
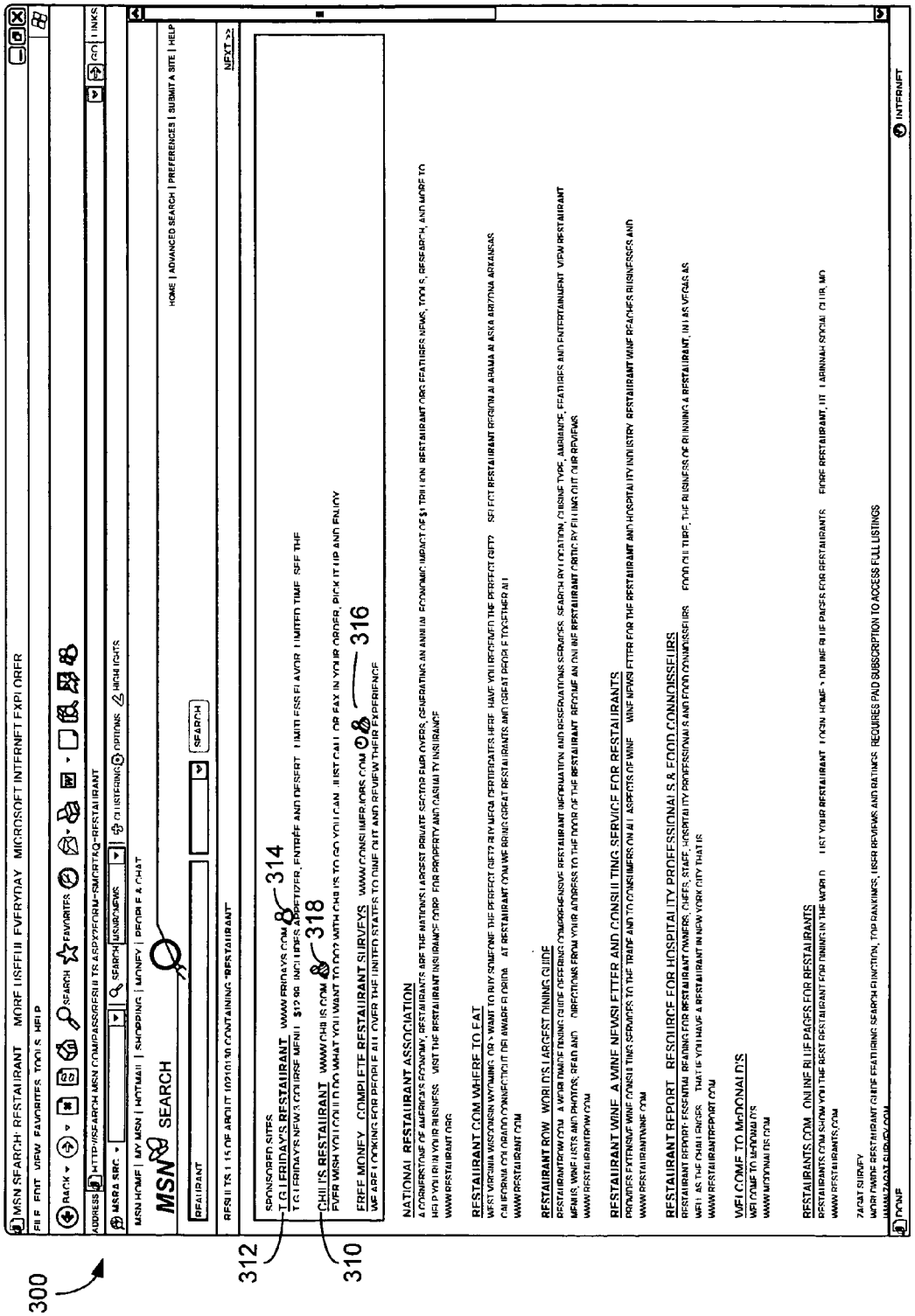
FIG. 3 is an illustrative screen display of an exemplary user interface wherein instant messaging enablement indicators are illustrated in conjunction with particular references whose contact information has been accessed through a search query.

With reference to FIG. 3, an illustrative screen display of an exemplary user interface for use with embodiments of the present invention is shown and designated generally as reference number 300. It will be understood and appreciated by those of ordinary skill in the art that the user interface 300 illustrated is offered by way of example only and that any user interface having a sponsored reference display area and an instant messaging enablement indicator, as more fully described, may be utilized and that all such variations are contemplated to be within the scope of the present invention.

The user interface 300 illustrates a vertical listing of references whose sponsors' contact information has been accessed through a search query. The exemplary user interface 300 includes a reference display area 310 configured to display at least one reference 312 in response to a search query. The at least one reference is associated with a source or content provider whose contact information is shown. The exemplary user interface 300 further includes an instant messaging enablement display area configured to display an instant messaging enablement indicator in association with the at least one reference. This is indicated by reference numerals 314, 316, and 318 in FIG. 3 to indicate that three different instant messaging enablement indicators are displayed in the instant messaging enablement display area, as more fully described below.

The exemplary user interface 300 shown indicates the results of a search request for the criteria "restaurant". In response, a plurality of references are shown as a result of such search request. Many of the references, e.g., "National Restaurant Association" and "Welcome to McDonald's", are void of an instant messaging enablement indicator in association therewith. This indicates that the reference is not a sponsored reference, that is, that the instant messaging capability of the source associated with the reference is not known.

Others of the plurality of references include an instant messaging enablement indicator in association therewith, e.g., "T.G.I.Friday's Restaurant", "Chili's Restaurant", and "Free Money—Complete Restaurant Surveys". The instant messaging enablement indicator 314 shown in the instant messaging enablement display area associated with the "T.G.I. Friday's Restaurant" reference is an un-shaded or colored outline of a particular shape. This is indicative of the fact that, while the instant messaging capabilities of the source associated with the "T.G.I.Friday's Restaurant" reference is known, such source is not instant messaging enabled.

The instant messaging enablement indicator 316 shown in association with the "Free Money—Complete Restaurant Surveys" reference is the same particular shape as instant messaging indicator 314 shaded with a first shading pattern. This is indicative of the fact that, while the source associated with the "Free Money—Complete Restaurant Surveys" reference is instant messaging enabled, there is no representative of the source currently online that is capable of at least one of receiving and transmitting instant messages. Also shown is a depiction of a clock showing the time eight o'clock. This indicates that the source associated with the reference "Free Money—Complete Restaurant Surveys" will have a representative available online at eight o'clock.

The instant messaging enablement indicator 318 shown in association with the "Chili's Restaurant" reference is the same particular shape as instant messaging indicator 314 shaded with a second shading pattern. This is indicative of the fact that the source associated with the "Chili's" reference currently has a representative thereof online that is capable of at least one of receiving and transmitting instant messages. In one embodiment, selection by the user of the instant messaging enablement indicator 318 associated with the "Chili's" reference will permit initiation of an instant messaging communication between the user and the representative of the source that is currently online.

In the illustrated user interface 300, the sponsored references are illustrated in the upper portion of a vertical listing of references selected for display in response to the user's search query "restaurant". It will be understood by those of ordinary skill in the art that such arrangement is by way of example only and is not intended to limit the scope of the present invention in any way.

By way of example only, existing web messenger technology, e.g., MSN web messenger technology available from Microsoft Corporation of Redmond, Washington, may be utilized to enable an instant messaging session in accordance with embodiments of the present invention. However, the reference source, that is, the business (or individual) associated with the reference, does not have to be on the user's buddy list for a session to be initiated, as is required with a conventional messenger application.

As can be understood, embodiments of the present invention provide systems and methods for integrating instant messaging capabilities with online content, e.g., the results of a search query or an online advertisement. Further, embodiments of the present invention provide systems and methods for enabling instant messaging capability between global computer network users, e.g., Internet users, and online businesses, e.g., advertisers, and the like. In one embodiment, when a business, e.g., an advertiser, desiring its contact information to be accessible online signs up for such service, it associates its messenger accounts (i.e., its instant messaging accounts) with its advertising accounts and, thus, references associated with that business become "sponsored" references. In this way, when an online user initiates an action that results in display of the advertiser's listing, the user will be presented not only with the advertiser's contact information but also with an indicator that indicates whether or not the advertiser is instant messaging enabled and whether the advertiser currently has a representative thereof capable of at least one of receiving and transmitting instant messages. If the advertiser is online, i.e., if a representative of the advertiser is capable of at least one of receiving and transmitting instant messages, and if the user is also logged into the same or a compatible instant messaging system, the user may select the instant messaging enablement indicator and initiate online contact with the advertiser.

Enabling instant messaging between global computer network users, e.g., Internet users, and businesses (or individuals) having their contact information online provides an alternative route for direct real-time interaction between a user and a business (or individual).

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. A computer system comprising a processor or processor system and program instructions stored on a computer storage medium that, facilitates instant messaging in association with an online content provider, the computer system comprising:

a first receiving module configured for receiving an indication to initiate display of online content;

a selecting module configured for selecting a reference in response to the indication, the reference being associated with a content provider;

a determining module configured for determining whether an instant messaging capability of content provider is known, wherein the instant messaging capability of the content provider is known if the content provider provided information about the content provider's instant message capability to the determining module, and for determining whether the content provider is instant messaging enabled or not instant messaging enabled, wherein the content provider is instant messaging enabled if the content provider has an instant messaging account associated with the reference, and wherein the content provider is not instant messaging enabled if the content provider does not have an instant messaging account associated with the reference; and a display module for displaying the reference concurrently with an instant messaging indictor in a upper portion of a list of references selected for display, the upper portion being an area for display of references with known instant messaging capabilities, wherein, if the instant messaging capability of the content provider is known and if the content provider is not instant messaging enabled, the instant messaging enablement indicator communicates that the content provider's instant messaging capability is known and that the content provider is not instant messaging enabled, wherein the indication to initiate display of online content comprises a request to initiate display of a website; and wherein the content provider comprises a provider of content relevant to the website.

2. The computer system of claim 1, wherein the indication to initiate display of online content comprises a search query; and wherein the content provider comprises a provider of content relevant to the search query.

3. A user interface embodied on at least one computer storage medium comprising memory that facilitates instant messaging in association with an online reference, the user interface comprising:

a reference display area that displays at least one reference in response to an indication to initiate display of online content, the at least one reference being associated with a content provider; and an instant messaging enablement display area for display of references with known instant messaging capabilities in a upper portion of a list of references selected for display that displays an instant messaging enablement indicator concurrently with the at least one reference, the instant messaging enablement indicator indicating that the instant messaging capability of the content provider is known and that the content provider is not instant messaging enabled, wherein the instant messaging capability of the content provider is known if the content provider provided information about the content provider's instant messaging capability to a service associated with the instant messaging enablement display, and wherein a content provider is not instant messaging enabled if the content provider does not have an instant messaging account associated with the at least one reference, wherein the indication to initiate display of online content comprises a request to initiate display of a website; and wherein the content provider comprises a provider of content relevant to the website.

4. The computer system of claim 3, wherein the content provider is an advertiser.

5. A computerized method for facilitating instant messaging in association with an online reference, the method comprising:

receiving an indication to initiate display of online content;

selecting a reference in response to the indication, wherein the reference is associated with a content provider;

determining if an instant messaging capability of the content provider is known; wherein the instant messaging capability of the content provider is known if the content provider provided information about the content provider's instant messaging capability;

if the instant messaging capability of the content provider is known for the reference, determining that the content provider is not instant messaging enabled, wherein a content provider is not instant messaging enabled if the content provider does not have an instant messaging account associated with the at least one reference, and if the instant messaging capability of the content provider is known for the reference and the content provider is not instant messaging enabled, displaying the reference with an instant messaging enablement indicator in a upper portion of a list of references selected for display, the upper portion being an area for display of references with known instant messaging capabilities that indicates that the content provider associated with the reference is not instant messaging enabled, wherein the indication to initiate display of online content comprises a request to initiate display of a website; and wherein the content provider comprises a provider of content relevant to the website.

6. The method of claim 5, wherein the step of receiving an indication to initiate display of the online content comprises receiving a search query, and wherein the content provider comprises a provider of content relevant to the received search query.

7. The method of claim 6, wherein if the content provider associated with the reference is instant messaging enabled, displaying the reference in association with an instant messaging enablement indicator, that indicates that the content provider is instant messaging enabled.

8. The method of claim 7, further comprising determining if the content provider is currently capable of at least one of receiving and transmitting instant messages, wherein if the content provider associated with the reference is currently capable of at least one of receiving and transmitting instant messages, displaying the reference in association with an instant messaging enablement indicator that indicates the content provider is currently capable of at least one of receiving and transmitting instant messages.

9. The method of claim 8, further comprising:

receiving an indication that the instant messaging enablement indicator that indicates the content provider is currently capable of at least one of receiving and transmitting instant messages has been selected by a user; and enabling instant messaging between the content provider and the user.

10. The method of claim 5, wherein the step of receiving an indication to initiate display of the online content comprises receiving a request to initiate display of a website, and wherein the content provider comprises a provider of content relevant to the website.

11. The method of claim 10, wherein the content provider is an advertiser.

12. The method of claim 5, wherein if it is determined that the instant messaging capability of the content provider is known and the content provider is instant messaging enabled, the method further comprises determining if the content provider is currently capable of at least one of receiving and transmitting instant messages, and wherein if the content provider is not currently capable of at least one of receiving and transmitting messages, displaying an instant messaging enablement indicator that indicates a time when the content provider will be capable of at least one of receiving and transmitting instant messages.

* * * * *